US010581375B2

(12) United States Patent
Hood

(10) Patent No.: US 10,581,375 B2
(45) Date of Patent: Mar. 3, 2020

(54) MOUNTING CLIP FOR STRUCTURE HAVING SPACED APART TRIM

(71) Applicant: David C. Hood, Lincoln, CA (US)

(72) Inventor: David C. Hood, Lincoln, CA (US)

( * ) Notice: Subject to any disclaimer, the term of this patent is extended or adjusted under 35 U.S.C. 154(b) by 23 days.

(21) Appl. No.: 15/622,882

(22) Filed: Jun. 14, 2017

(65) Prior Publication Data

US 2018/0076760 A1 Mar. 15, 2018

Related U.S. Application Data

(63) Continuation-in-part of application No. 15/488,275, filed on Apr. 14, 2017, now Pat. No. 10,187,007.

(Continued)

(51) Int. Cl.

*H02S 40/34* (2014.01)
*H02S 30/00* (2014.01)

(Continued)

(52) U.S. Cl.

CPC ............ *H02S 40/34* (2014.12); *F16B 5/0064* (2013.01); *F24S 25/12* (2018.05); *F24S 30/425* (2018.05);

(Continued)

(58) Field of Classification Search

CPC ........ H02S 40/34; H02S 40/345; H02S 30/10; H02S 20/26; H02S 20/00; H02S 20/10;

(Continued)

(56) References Cited

U.S. PATENT DOCUMENTS 4,433,200 A 2/1984 Jester et al.
4,535,503 A * 8/1985 Narita .................. E05D 5/0246 16/109

(Continued)

FOREIGN PATENT DOCUMENTS

JP 2010192854 A * 9/2010
JP 2015158101 A 9/2015

(Continued)

OTHER PUBLICATIONS

Machine translation of JP2010-192854A (Year: 2010).*

(Continued)

*Primary Examiner* — Eric R Smith

(74) *Attorney, Agent, or Firm* — Haynes Beffel & Wolfeld LLP; Andrew L. Dunlap

(57) ABSTRACT

A mounting clip, mounting an element to a structure having trim with a thickness, includes a body having first and second legs with a gap therebetween sized for receiving the trim. The first leg is positionable against the element. The first and second legs have aligned, possibly threaded, through holes. The element can be fastened to the trim through the clips without penetrating the structure. The first leg has a distal end which can be curved to act as a trim engagement element. The mounting clip and fastener structure, such as a threaded fastener, can constitute a mounting clip assembly. A PV panel wire cover assembly includes a wire-covering housing having open ends and a mounting flange. Closed and open end cap mountable to the open ends prevent access to the housing interior when the housing is mounted to the panel, the open end cap having a wire passage opening.

8 Claims, 14 Drawing Sheets

58
74
64
66
60
76
70

Related U.S. Application Data

(60) Provisional application No. 62/404,653, filed on Oct. 5, 2016, provisional application No. 62/352,763, filed on Jun. 21, 2016, provisional application No. 62/322,363, filed on Apr. 14, 2016.

(51) Int. Cl.

*H02S 40/36* (2014.01)
*H02S 20/10* (2014.01)
*F24S 25/12* (2018.01)
*F24S 30/425* (2018.01)
*H02S 20/32* (2014.01)
*F16B 5/00* (2006.01)

(52) U.S. Cl.

CPC .............. *H02S 20/10* (2014.12); *H02S 20/32* (2014.12); *H02S 30/00* (2013.01); *H02S 40/36* (2014.12)

(58) Field of Classification Search

CPC .......... H02S 20/20; H02S 20/21; H02S 20/22; H02S 20/23; H02S 40/30–44; H02S 30/00–20; H02S 40/36; F24J 2002/522; F24J 2002/5298; F16B 5/0032; F16B 5/0064; F16B 5/121; F16B 5/126; F16B 5/02; F16B 5/06; F16B 5/0607; F16B 5/0685; F16B 5/12–128

See application file for complete search history.

(56) References Cited

U.S. PATENT DOCUMENTS 5,164,020 A 11/1992 Wagner et al.
6,066,796 A * 5/2000 Itoyama ............ H01L 31/02008 136/251
10,177,707 B2 1/2019 Hood
10,187,007 B2 1/2019 Hood
2003/0070368 A1 4/2003 Shingleton
2011/0088740 A1* 4/2011 Mittan ................... F24J 2/5205 136/244
2011/0265860 A1 11/2011 Ciasulli et al.
2011/0303262 A1 12/2011 Wolter
2012/0192925 A1 8/2012 Grushkowitz et al.
2012/0227339 A1* 9/2012 Reinecke ............ E04F 11/1812 52/234
2014/0008508 A1* 1/2014 Weber .................... A42B 3/044 248/316.1
2014/0048498 A1 2/2014 Kuan
2014/0137927 A1 5/2014 Kim et al.
2014/0246077 A1 9/2014 Poulakis
2014/0329420 A1 11/2014 Magno
2015/0040967 A1* 2/2015 West ....................... H02S 20/23 136/251
2016/0268965 A1 9/2016 Stearns et al.
2017/0207743 A1 7/2017 Lemos et al.

FOREIGN PATENT DOCUMENTS

KR 101562850 B1 10/2015
WO WO-2009029897 A2 * 3/2009 ....... B32B 17/10036

OTHER PUBLICATIONS

U.S. Appl. No. 15/488,275—Office Action dated Oct. 18, 2017, 28 pages.
U.S. Appl. No. 15/488,275—Non-Provisional Application filed Apr. 14, 2017, 48 pages.
U.S. Appl. No. 15/488,275—Response to Office Action dated Oct. 18, 2017, filed Nov. 16, 2017, 18 pages.
U.S. Appl. No. 15/622,849—Non-Provisional Application filed Jun. 14, 2017, 29 pages.
PCT/US/2017/027782—International Search Report and Written Opinion dated Sep. 20, 2017, 10 pages.
U.S. Appl. No. 15/488,275—Final Office Action dated Feb. 27, 2018, 21 pages.
U.S. Appl. No. 15/488,275—Response to Final Office Action dated Feb. 27, 2018, filed May 11, 2018, 13 pages.
U.S. Appl. No. 15/488,275—Office Action dated Jul. 24, 2018, 16 pages.
U.S. Appl. No. 15/488,275—Response to Office Action dated Jul. 24, 2018, filed Jul. 26, 2018, 10 pages.
U.S. Appl. No. 15/488,275—Notice of Allowance dated Sep. 21, 2018, 8 pages.
U.S. Appl. No. 15/622,849—Notice of Allowance dated Aug. 30, 2018, 14 pages.

* cited by examiner

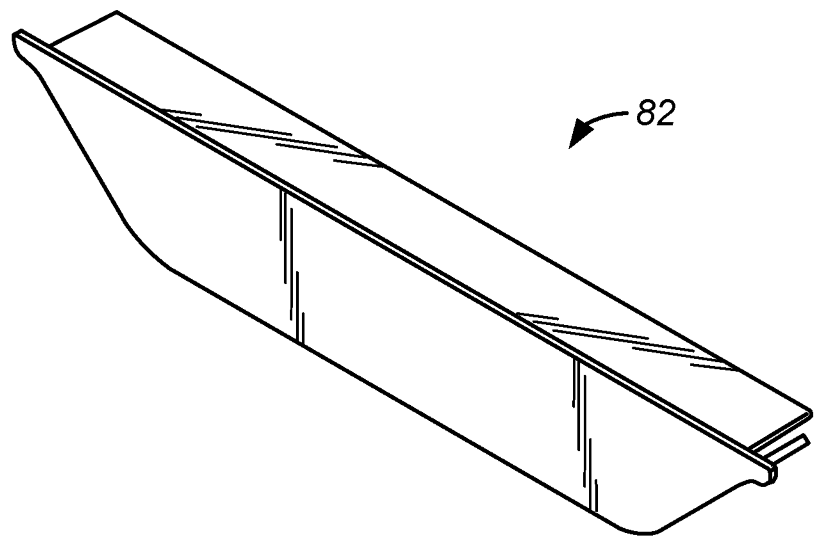
FIG. 14
82
FIG. 15
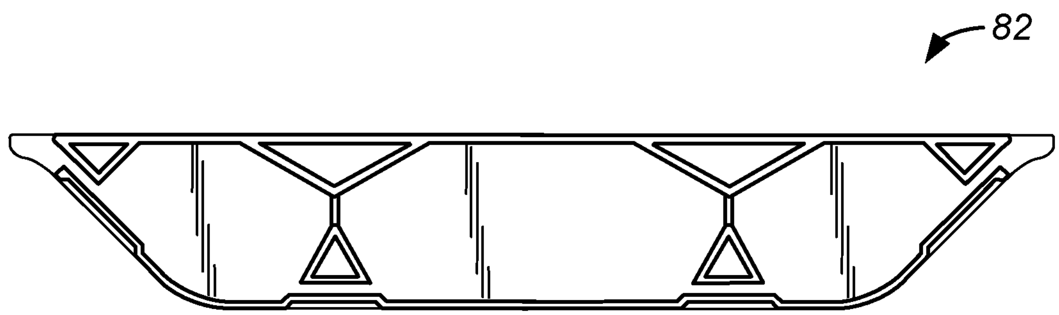
FIG. 16

MOUNTING CLIP FOR STRUCTURE HAVING SPACED APART TRIM

CROSS-REFERENCE TO OTHER APPLICATIONS

This application is a continuation-in-part of application Ser. No. 15/488,275, filed 14 Apr. 2017, entitled Wire Cover and Mounting Bracket, which claims the benefit of U.S. provisional patent application No. 62/322,363 filed 14 Apr. 2016. This application claims the benefit of the following U.S. provisional applications 62/352,763, filed 21 Jun. 2016, entitled Cover and Clip for Solar Panel; and 62/404,653 filed 5 Oct. 2016, entitled Clip for Solar Panels and Similar Things. The disclosures of each are incorporated by reference.

BACKGROUND OF THE INVENTION

Solar photovoltaic (PV) panels are typically provided of rigid planar form with each panel having a similar size, typically rectangular and approximately two to three feet in a shorter dimension and four to six feet in a longer dimension. Solar cells are provided upon a front surface of the solar panel. These individual cells are electrically connected together. A junction box is provided on a rear surface of each panel which gathers up the electric power generated by the cells on the panel and passes this electric power onto wires. These wires from the junction box can facilitate wiring together of multiple panels of an array to produce the overall power generated by the array of panels.

Solar panels are required to be deployed in an outside environment exposed to solar radiation, where the panels are also exposed to extremes of temperature and moisture. Furthermore, birds and other animals typically have access to the panels and the wiring connecting the panels together. One of the significant benefits of solar power systems of the PV panel variety is that they have no moving parts which must require maintenance or periodic inspection/replacement, as is the case with other distributed power assets such as wind turbines. However, the outside exposure experienced by the panel and its associated wires can result in damage occurring to the panels even without the panels experiencing any motion. Some solar panel arrays are mounted in a movable fashion to "track" the sun. Such tracking systems can be kept quite simple and easy to maintain, so that the panels do not require significant maintenance or inspection for reliable operation.

Perhaps the greatest source of PV panel array failure is presented in association with the wires that connect the individual panels together. The wires have connectors where they are joined to other segments of wire or to the junction boxes of various panels. If the wires become damaged, the system of PV panels can fail. The wires also benefit from minimizing expense through only providing an amount of exterior insulation necessary and to otherwise structure the wire with a relatively light and low cost configuration, including diameter, conductive material, insulating material, insulating material thickness, etc. Furthermore, the wires themselves can be extensive in length and represent a significant value for the overall panel system. It is known in certain instances for thieves to steal wire, such as the wire joining PV panels together, to recycle the wire for its inherent value in the conductive metals contained therein, or to repurpose the wire in other ways.

SUMMARY

A summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow. Hello Amy, A mounting clip is used to mount an element to a structure, with the structure having trim piece, the trim piece having a thickness. The clip includes a body having a proximal end, a first leg and a second leg. The first leg is generally parallel to and joined to a second leg at the proximal end of the clip. The first leg has a distal end. A gap between the first and second legs is sized for receipt of the trim piece of the structure. The first leg of the clip is positionable against the element. The first and second legs have holes passing therethrough and aligned with each other. The element can be fastened to the trim piece of the structure through the clips without penetrating the structure.

Some examples of the mounting clip can include one or more the following. One of the holes can be a threaded hole. The clip can include a trim engagement element at the distal end of said first leg; the first leg can have a curved distal end constituting the trim engagement element.

A mounting clip assembly is used to mount an element to a structure, the structure having trim piece, the trim piece having a thickness. The clip assembly includes a clip and fastener structure. The clip has proximal end, a first leg and a second leg, the first leg generally parallel with and joined to the second leg at the proximal end of the clip. The first leg has a distal end. A gap between the first and second legs is sized for receipt of the trim piece. The first leg of the clip is positionable against the element. The trim piece is positionable between the second and first legs of the clip. Holes pass through the second leg and the first leg, the holes being aligned with each other. The fastener structure is engageable with the element and is passable through the holes in the second and first legs of the clip to bias the legs towards one another. The element can be fastened to the trim piece of the structure through the clip and fastener structure without penetrating the structure.

A PV panel wire cover assembly is mountable to a surface of a PV panel for covering wires extending along the surface of the PV panel. The wire cover assembly includes an elongate wire-covering housing having first and second opposite sides, the wire-covering housing defining a housing interior. The assembly also includes a first flange extending away from the first opposite side. The wire-covering housing it is securable to the surface of the PV panel through the first flange with the housing interior overlying the wires. The wire-covering housing has first and second open ends. A closed end cap is mountable to the first open end to prevent access to the housing interior when the wire-covering housing is mounted to the surface of the PV. An open end cap it is mountable to the second open end and has a wire passage opening. A jumper tube extends from the open end cap to provide a wire passageway from the wire passage opening through the jumper tube, whereby the open end cap and jumper tube extending therefrom prevents access to the housing interior other than through the wire passageway when the wire-covering housing is mounted to the surface of the PV panel.

Some examples of the PV panel wire cover assembly can include one or more the following. The open end cap can have a hollow extension to which the jumper tube is mounted; the hollow extension and the jumper tube can have complementary cross-sectional shapes. The jumper tube can be split along with length to facilitate mounting to the hollow extension of the open end cap.

Other features, aspects and advantages of technology disclosed can be seen on review the drawings, the detailed description, and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 14 is a front, top, right side view of the closed end cap shown in FIG. 6.

FIG. 15 is a top plan view of the end cap of FIG. 14.

FIG. 16 is a rear elevation view of the end cap of FIG. 14.

DESCRIPTION OF THE INVENTION

To protect the wires and to hide them from view, it is desirable to provide a cover for the runs of wire which join PV panels together. Such covers would both protect the wires and make the wires less enticing to thieves, and present some degree of impediment to thieves interested in stealing the wires. While a basic cover could be provided over runs of wire joining panels together including a cover element and with a flange having a hole therein which can receive a fastener, a significant problem is encountered in that the flange of such a basic cover requires a hole in the panel through which a fastener can pass for connecting the cover to a panel. PV panels are typically substantially free of fastener holes thereon, other than fastener holes which are already dedicated to other purposes, including panel mounting purposes. Without a hole available for securing such a cover to the panel, one is left with the undesirable prospect of perhaps drilling an additional hole in the panel (which may void its warranty), which not only has significant propensity to damage the panel, it involves significant additional work. Accordingly, a need exists for a system for a wire-covering system for an array of photovoltaic panel which does not require drilling of holes into the panels, but can still allow for a wire cover to be mounted to the panels in a simple manner.

According to the present technology, in some examples a clip is provided which can be easily attached to a panel or other structure without requiring drilling of holes into the structure. The clip can include a hole to which a fastener can join for attaching items to the structure. Typically, multiple clips can be used together to hold an item, such as a wire cover, to a structure, such as a PV panel.

Figure 1:
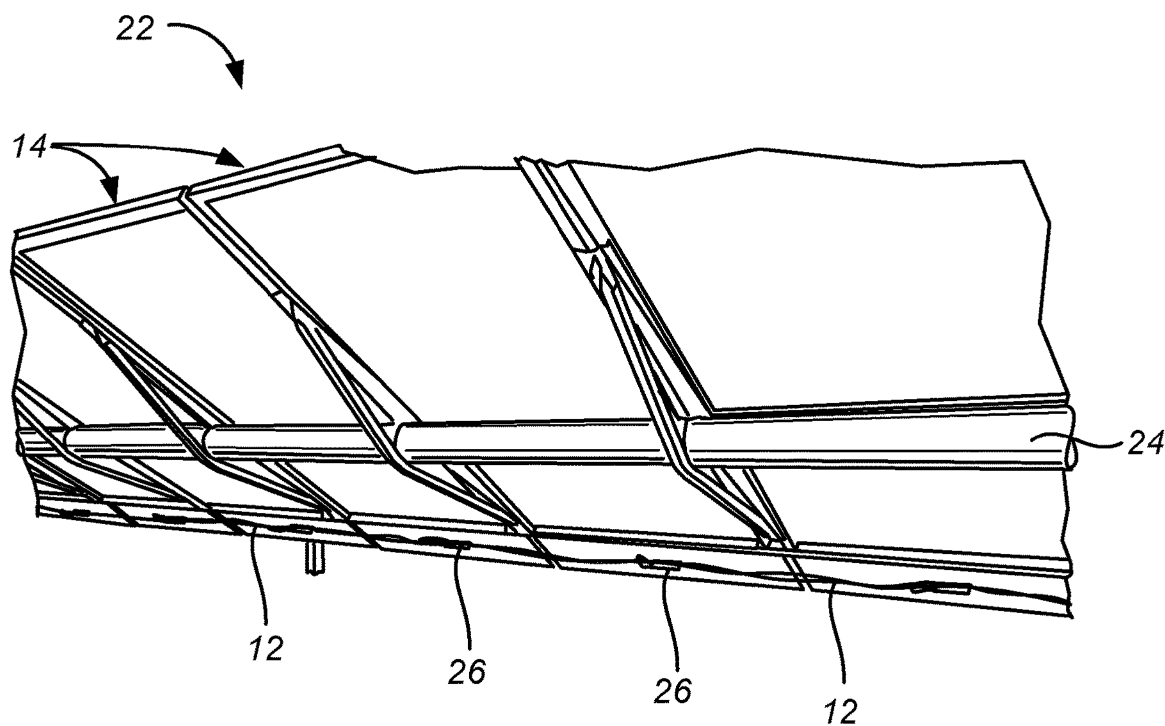
FIG. 1 is a rear perspective view of a conventional array of PV panels mounted to a common tracking bar.

FIG. 1 is a rear perspective view of a conventional array 22 of PV panels 14 mounted to a common tracking bar 24. A junction box 26 is seen mounted along an edge of each PV panel 14 with exposed wires 12 extending from the junction boxes.

Figure 2:
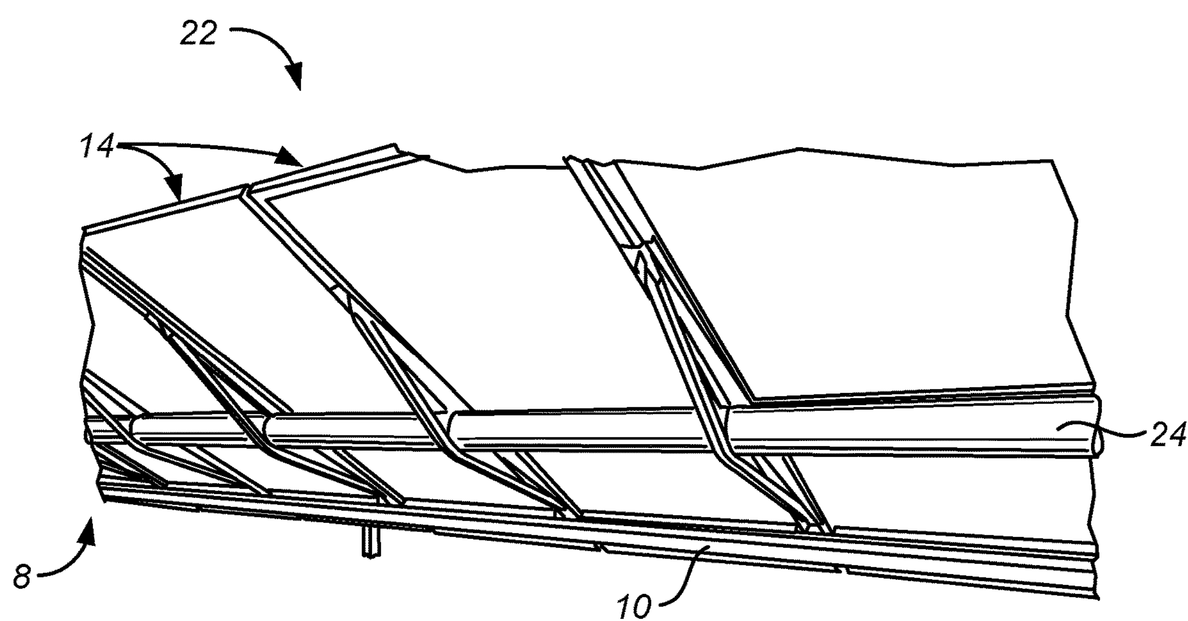
FIG. 2 is a rear perspective view of an array of PV panel wire cover assembly used with an array of PV panels mount to a common tracking bar.

With this technology, a PV panel wire cover assembly 8, see FIG. 2, includes a wire cover 10, also referred to as cover 10, for covering wires 12 which join photovoltaic (PV) panels 14 together so that they cannot be seen and to help protect the wires from the weather, vandalism, theft and animals. PV panels 14 are also referred to as panels 14 or solar panels 14. Assembly 8 also includes a clip 16 which can be easily attached to a panel 14 without requiring drilling of holes thereinto, and which clip 16 presents a hole 18 to which a fastener 20, such as a screw or bolt, can join after having interfaced with a wire cover 10, so that between the wire cover 10 and a series of such clips 16, the wire cover 10 can be coupled to the panels in a manner overlying the wires thereof.

Figure 3:
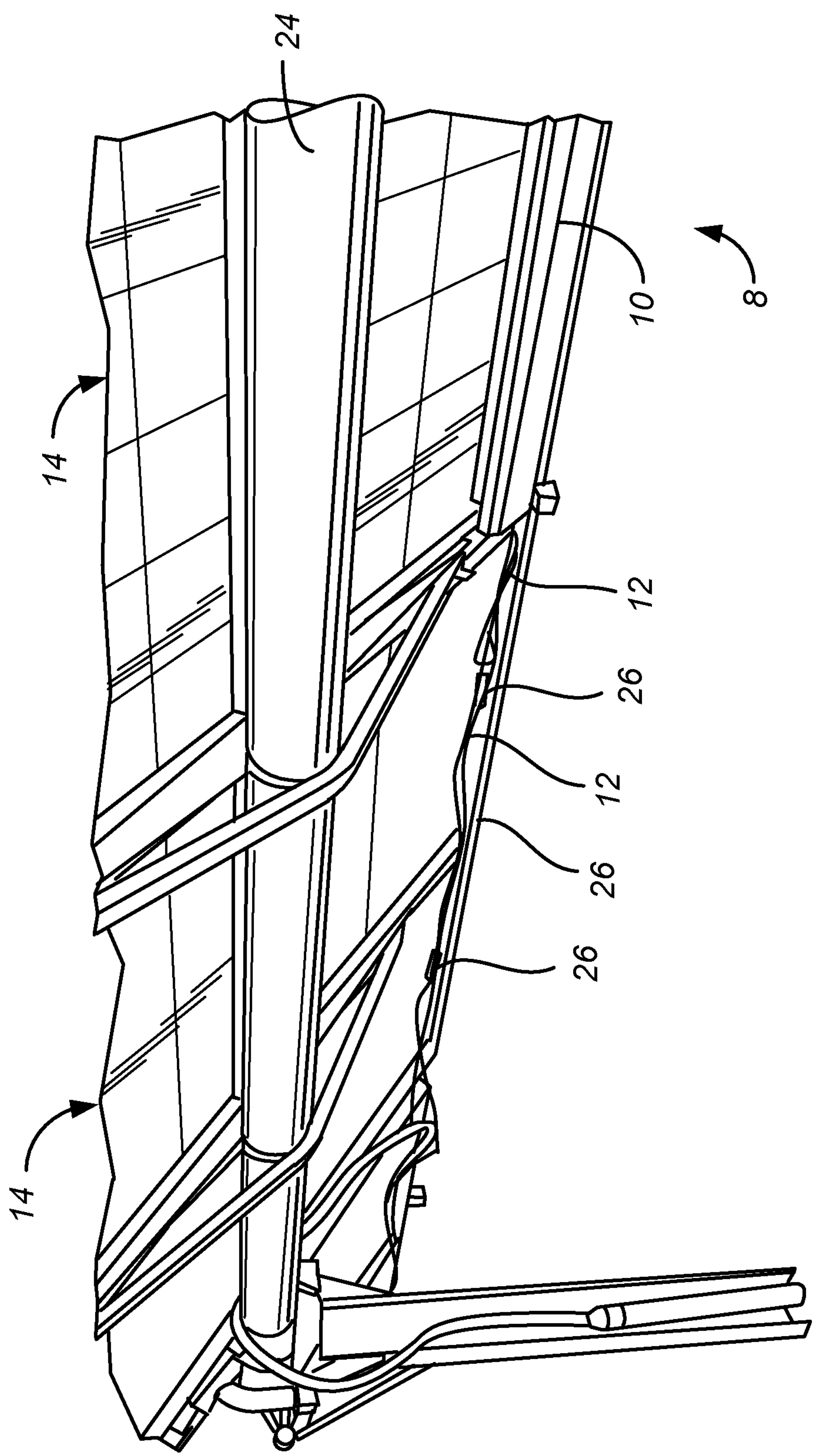
FIG. 3 is a view similar to that of FIG. 2 during the installation of wire covers to the array of PV panels, showing wires covered by a wire cover and wires to be covered by a subsequently installed wire cover.

FIG. 3 shows a wire cover 10 during installation with wires 12 extending from the open end of a wire cover 10 prior to installation of the next wire cover 10. FIGS. 8-11 illustrate how the wire cover 10 has a pair of flanges 28, 30 and a wire-covering housing 32 defining a housing interior 34 between the flanges. Wire-covering housing 32 is sized, in particular to have sufficient depth 36, to accommodate the wires 12 bundled therein. The flanges 28, 30 include slots. These slots are preferably of a variety which is elongate in form with rounded ends and with a length thereof parallel with a length of the wire-covering housing 32 of the wire cover 10. Such slots are provided on each flange 28, 30 directly adjacent to this wire-covering housing 32. Because the panel-to-panel spacing 46 between solar panels 14 in array 22 can vary slightly, slots 38, 40 are provided rather than a single hole, to accommodate some variation in panel-to-panel spacing. Longer flange 28 includes a notch 42 at each end. Notch 42 is useful in placing cover 10 under the edge of the PV panel frame thus reducing the need for clips and speeding up installation. However, for some types of equipment notch 42 can be omitted to create a notch less wire cover 10 indicated by the dashed lines 44 in FIG. 8.

Figure 4:
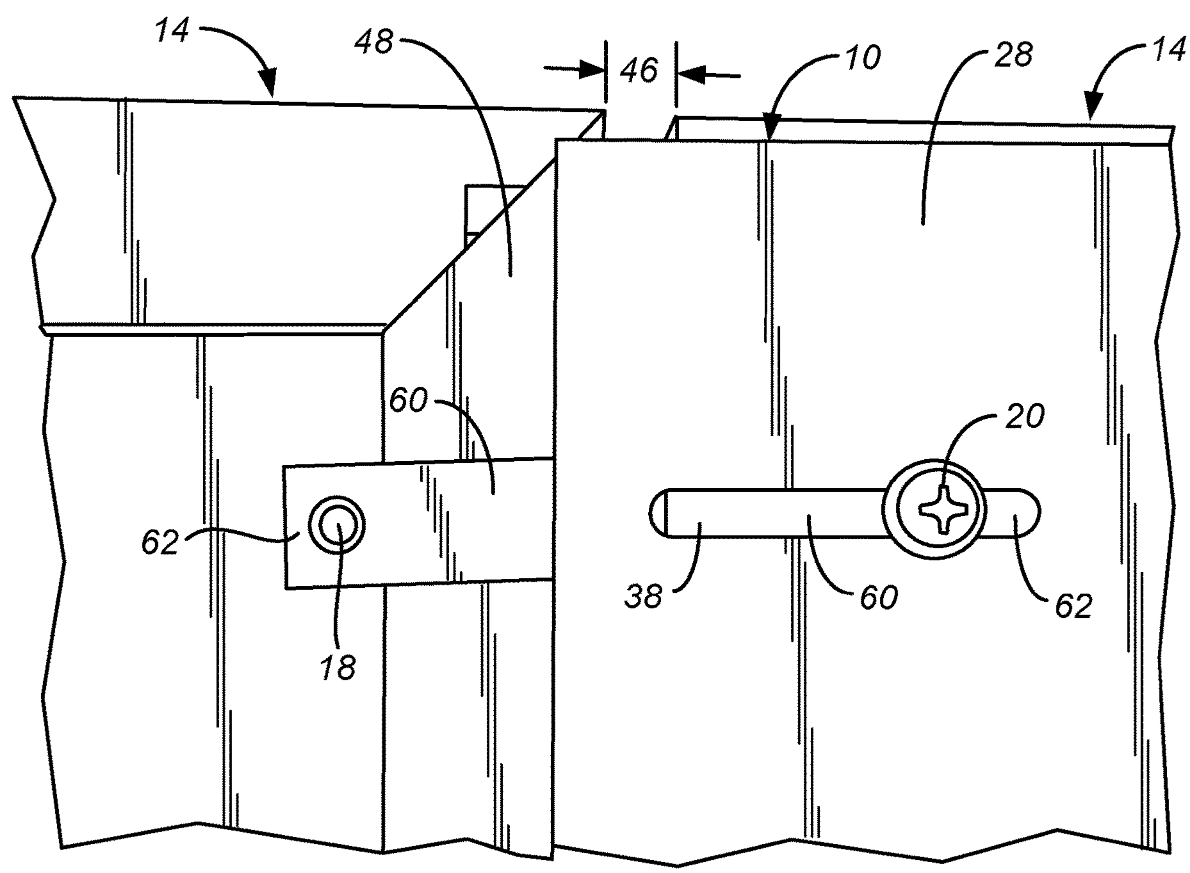
FIG. 4 is an enlarged view of a portion of the structure of FIG. 3 showing clips engaging trim pieces at opposed edges of adjacent PV panels.
Figure 4A:
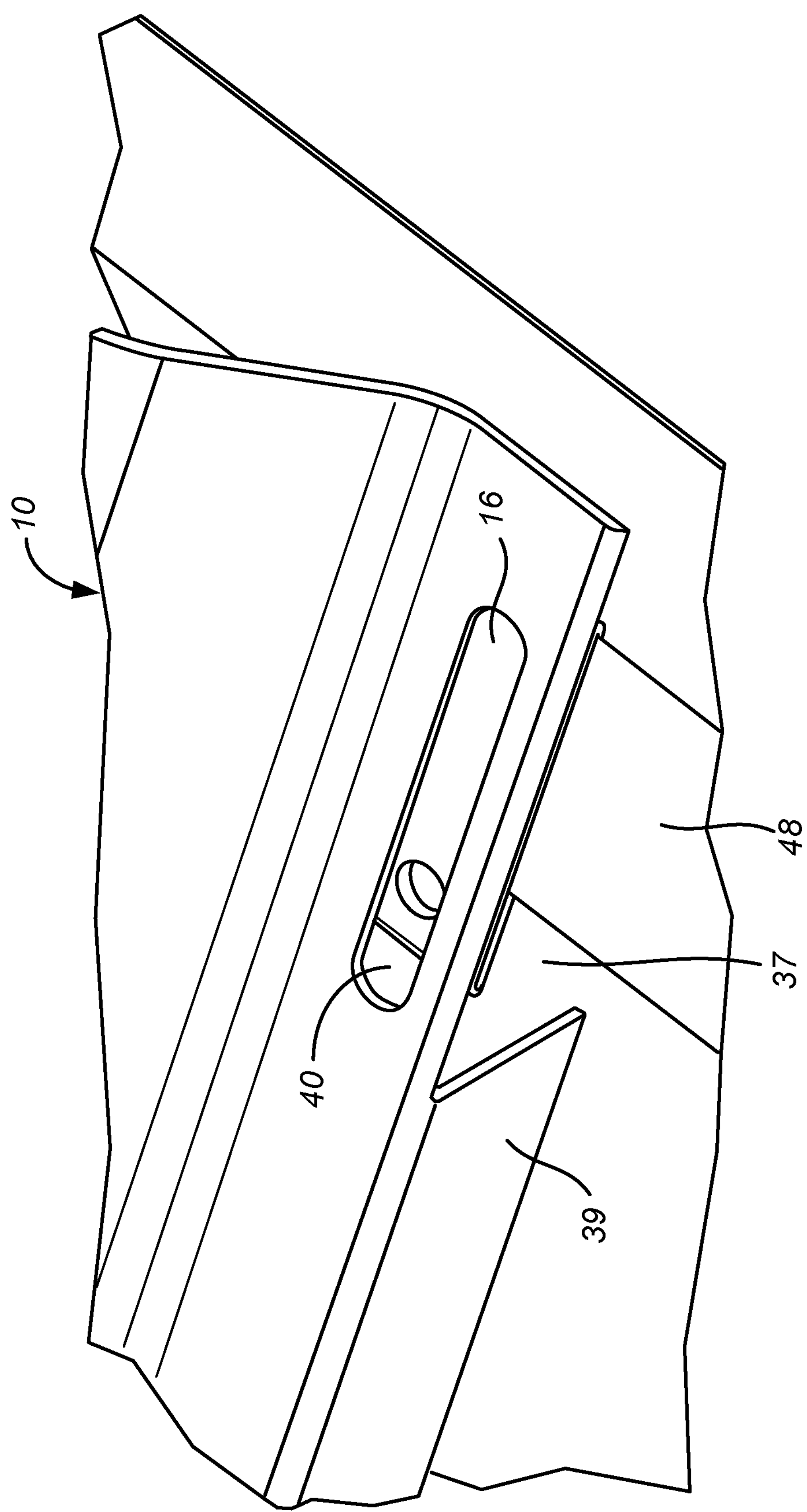
FIG. 4A is an enlarged view of a corner of a wire cover showing a notch in the skirt providing access to the clip prior to attaching the fastener to the clip.
Figure 5:
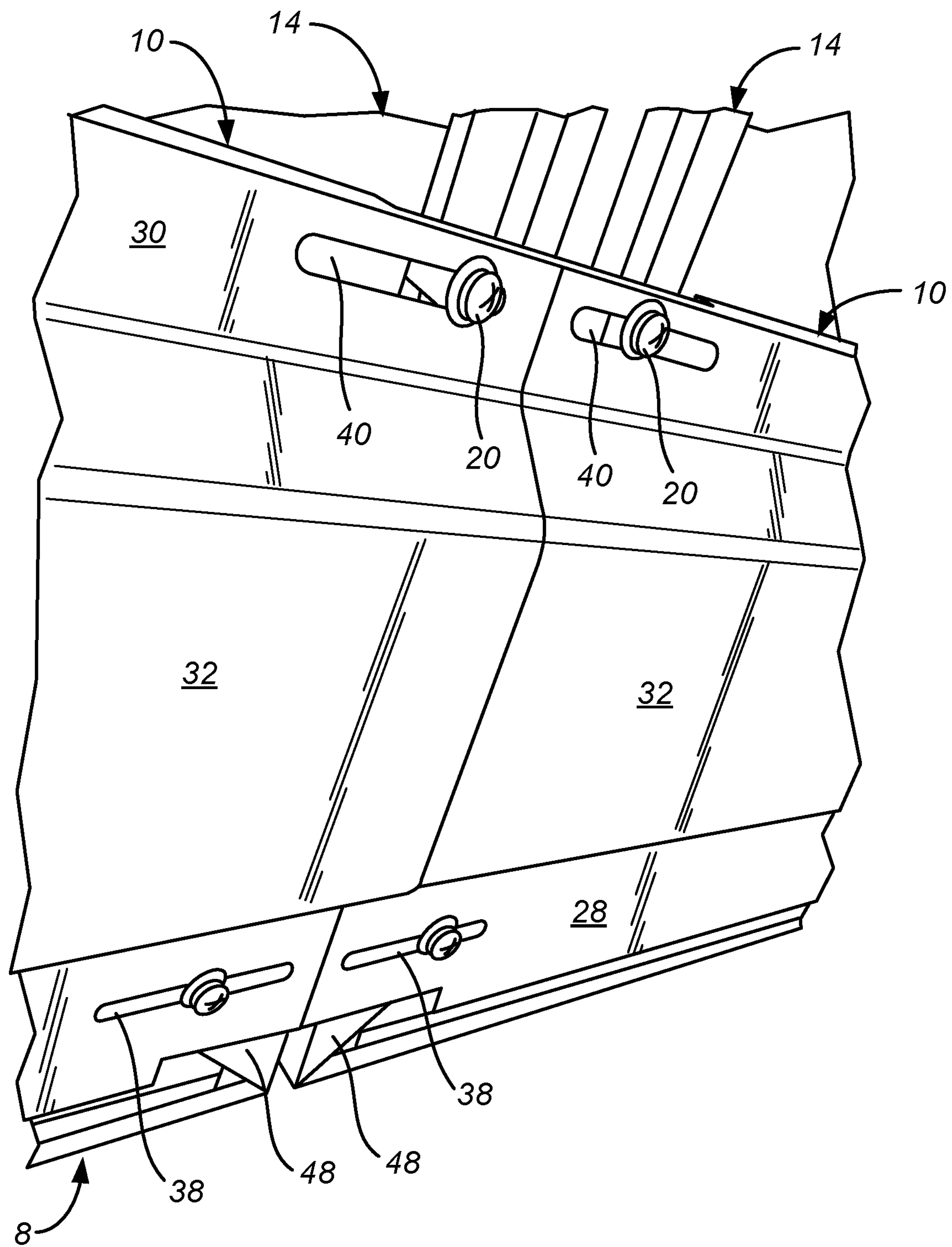
FIG. 5 is an enlarged perspective view a portion of the structure of FIG. 2 showing an end of one wire cover overlapping the end of an adjacent wire cover.
Figure 12:
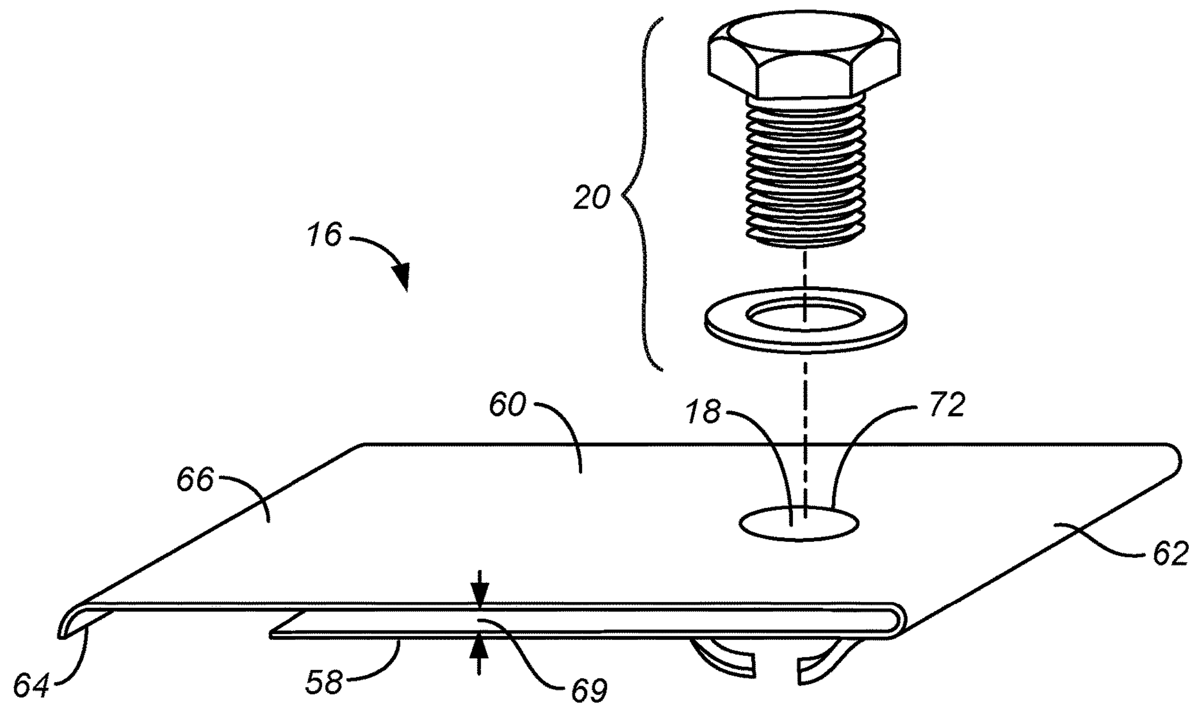
FIG. 12 is a top, front, right side view of a clip partially shown in FIG. 4 together with a fastener.
Figure 13:
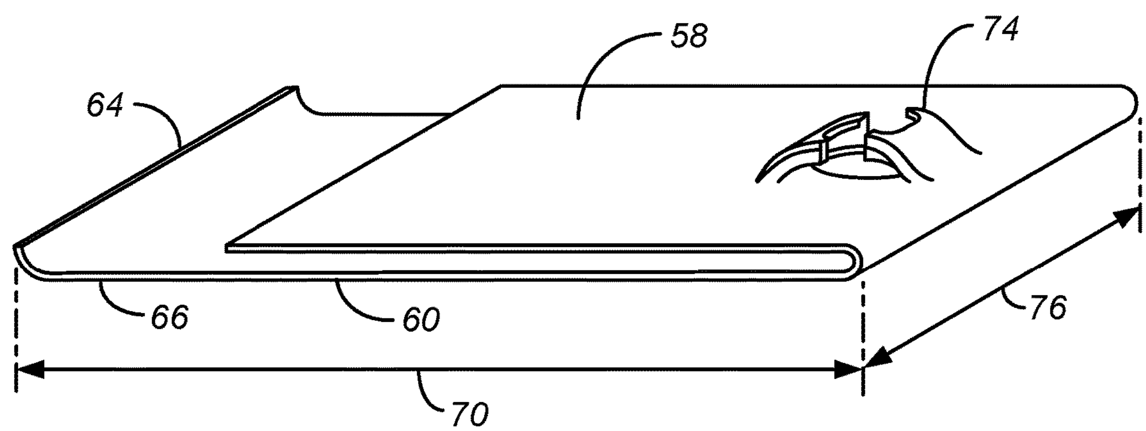
FIG. 13 is a bottom, front, right side view of the clip of FIG. 12.

Details of the clips 16 are shown in FIGS. 12 and 13, as well as FIG. 4 Each clip 16 can be a bent piece of spring steel (or optionally other material) which fits over a piece of trim 48 along the lateral sides 50 of the PV panels 14 or other structure; see FIGS. 2-5. Trim 48 extends generally perpendicular to the side-to-side orientation of wires 12 and wire covers 10. Trim 48 is offset a distance slightly from a rear surface 54 of the panel with a width a distance sufficient to allow a second, short leg 58 of the clip 16 to reside therein. The clip 16 has a first, long leg 60 opposite the short leg 58 with the two legs substantially parallel to each other and joined together at a proximal end 62 of the clip. The long leg 60 ends at a trim engagement element 64, also called a tooth 64, at a distal end 66 thereof which can wrap around and grip somewhat an outer edge 68 of the trim 48. The proximal ends of each leg of the clip 16 are joined together so that the clip 16 is, in this example, a continuous piece of metal. A spacing or gap 69 between the legs 58, 60 of the clip 16 is preferably similar to a thickness of the trim 48 on the panel 14, so that somewhat of a friction fit is provided when the clip 16 is slid over the trim 48 with the trim 48 between the legs 58, 60.

Figure 13A:
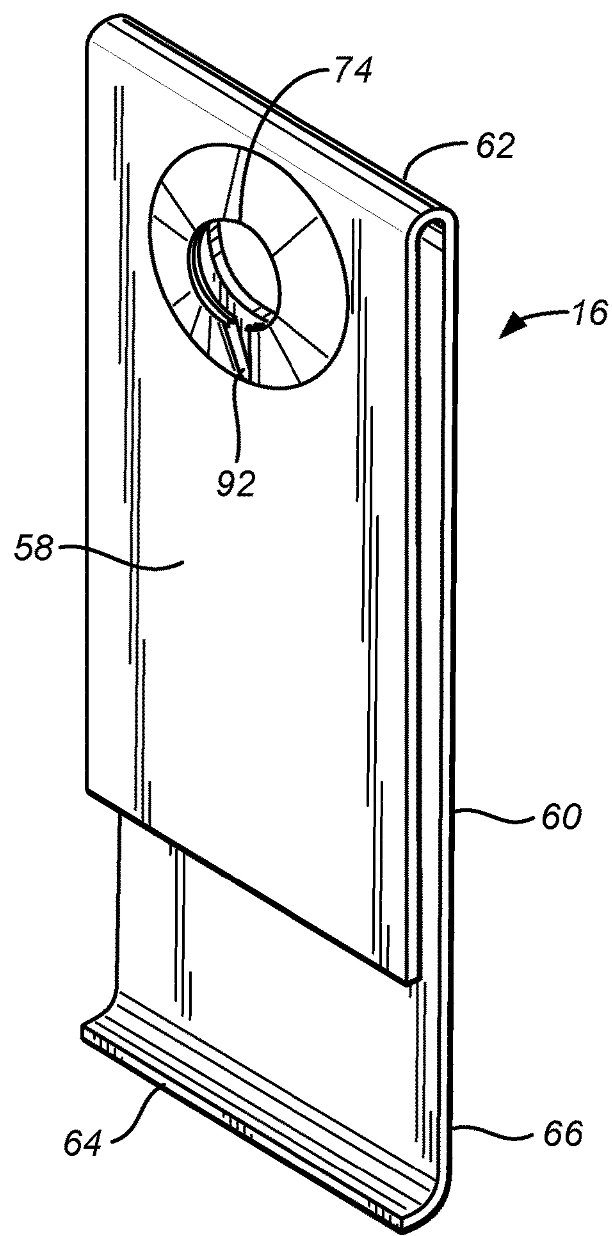
FIG. 13A is a perspective view of an alternative embodiment of the clip of FIGS. 12 and 13, with FIG. 13B and FIG. 13C being bottom plan and front elevation views thereof.
Figure 13B:
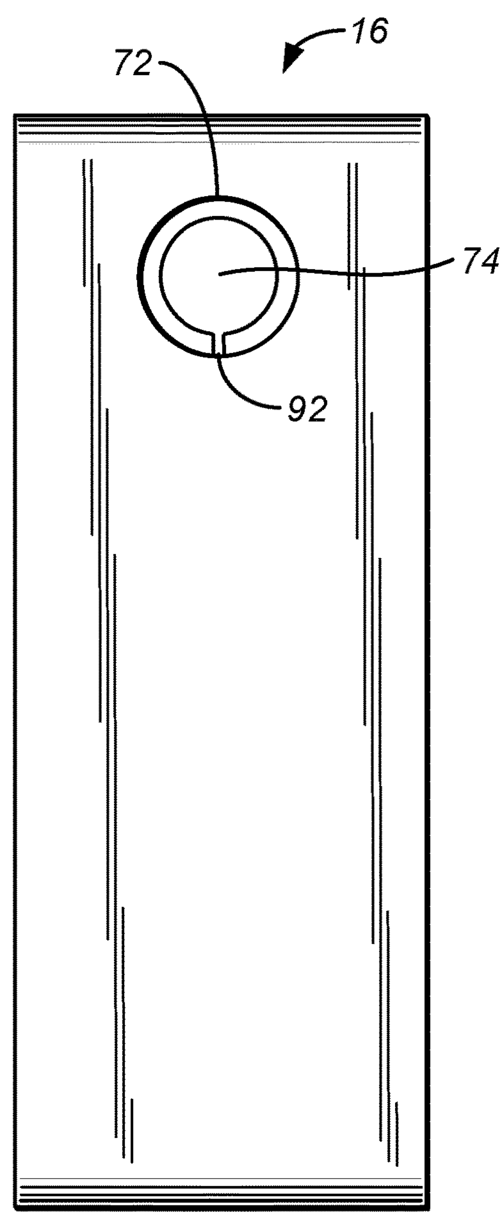
Figure 13C:
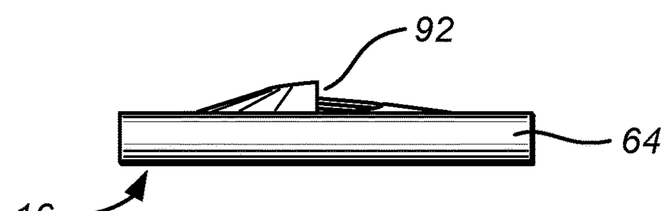
Figure 17:
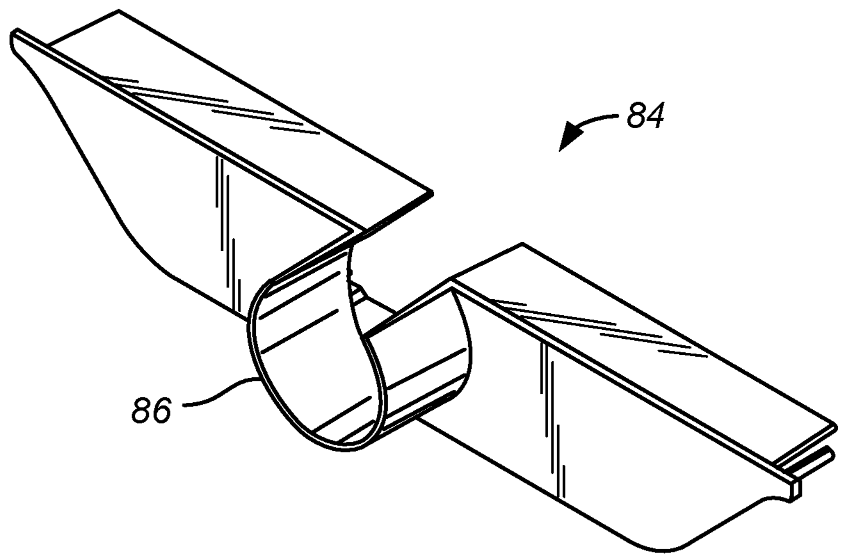
FIG. 17 is a front, top, right side view of the open end cap shown in FIG. 7.
Figure 18:
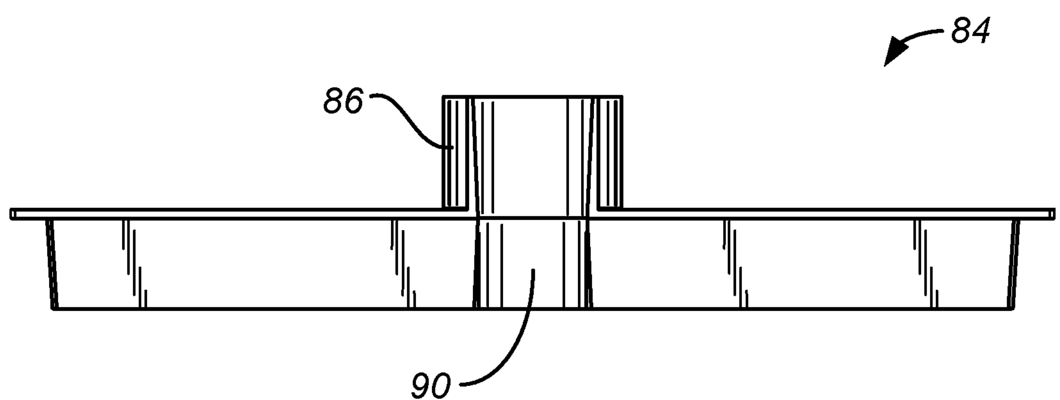
FIG. 18 is a top plan view of the end cap of FIG. 17.
Figure 19:
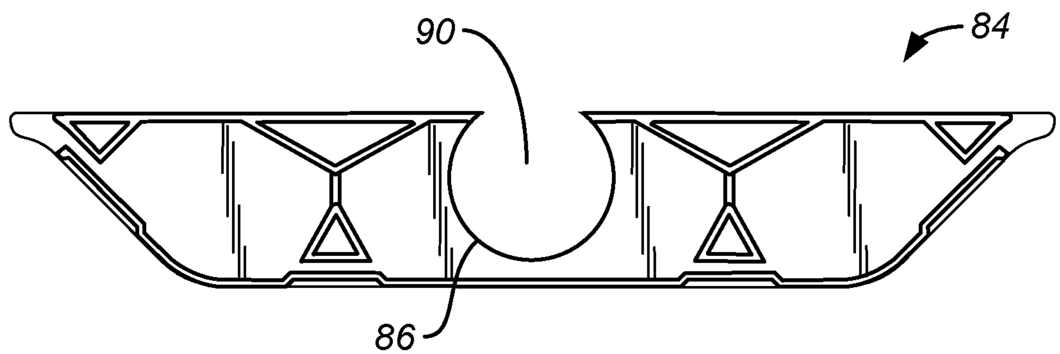
FIG. 19 is a rear elevation view of the end cap of FIG. 17.

FIGS. 13A-13C illustrate an alternative embodiment for clip 16. In this embodiment the threaded hole 74 can be created by simply by notching a hole formed in short leg 58 with a starter notch 92, preferably forming a bend on the trailing side of the notch to capture the leading tip of the threads of the fastener.

Figure 20:
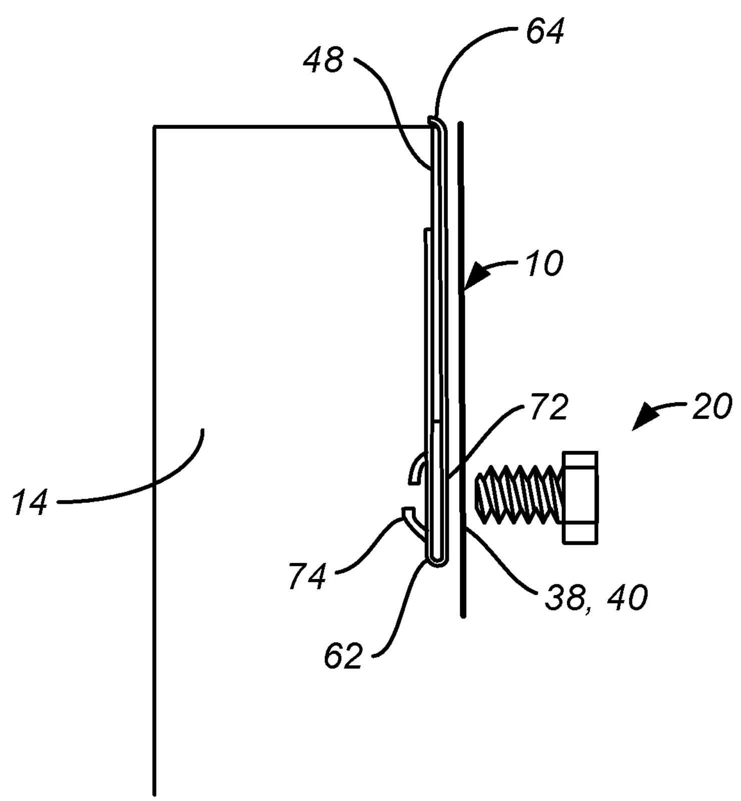
FIG. 20 is a simplified edge view showing a clip mounted to a trim piece of the solar panel with a flange of the wire cover about to be secured to the clip by a fastener.

FIG. 20 is a simplified edge view showing a clip 16 mounted to a trim piece 48 of the solar panel 14 with a flange 28, 30 of the wire cover 10 about to be secured to the clip by a fastener 20. An overall width of the clip 16 between the distal tooth 64 at the tip of the long leg 60 and a curve at the proximal end 62 where the long leg 60 and short leg 58 are joined together, see dimension 70 in FIG. 13, is greater than the width 56 of the trim 48 by an amount sufficient so that hole 18, which in this example includes a top through-hole 72 and a bottom threaded hole 74, passing through the clip 16 can be positioned off of the trim 48. See FIGS. 13 and 20. These holes 72, 74 pass through both the long leg 60 and the short leg 58 of the clip 16 with the holes adjacent to the curving proximal end 62 of the clip 16 which joins the long leg 60 and the short leg 58 together. The holes preferably are similar in size and aligned together, but, in this example, with the hole 74 in the short leg 58 being threaded and the hole 72 in the long leg 60 being a through hole and not threaded. It is also conceivable that both of the holes could be threaded or neither of the holes could be threaded and still function according to this technology if, for example, using non-threaded fasteners or if a threaded fastener pair such as a bolt and nut are used together. Most preferably, however, the short leg 58 has its hole 74 threaded and the long leg 60 does not have its hole 72 threaded.

In one embodiment, if the trim 48 has a one inch width 56, the long leg 60 could have a two inch length and the short leg 58 could have a one and a half inch length. In such a configuration a quarter inch hole could be provided which is spaced approximately a quarter inch to a half inch away from the curving proximal end 62 of the clip 16 where the long leg 60 and short leg 58 come together. The clip 16 could have various different widths 76; clip 16 is shown with approximately a three-quarter inch width in the embodiment depicted.

If the clip 16 is formed of materials other than spring steel (e.g., aluminum, other metals, or plastic) it still preferably functions to clamp and hold to the trim 48. Plastic materials can be, for example, injection molded or formed in another type of casting procedure or by other fabrication means. The geometry of the clip 16 can be the same as that described herein or can be modified slightly if formed of plastic. The clip 16 will have a tendency to stay where initially placed. Furthermore, once a fastener 20 passes through the non-threaded hole 72 in the long leg 60 and then threads into the threads in the threaded hole 74 in the short leg 58, the long leg 60 and short leg 58 are drawn together and further pinch the clip 16 tightly against the trim 48. The clip 16 thus conveniently tends to stay where positioned before use, but can be repositioned fairly easily before it has been used, such as by sliding along the trim 48 with the tooth 64 at the distal end 66 of the long leg 60 keeping the clip 16 aligned where it is desired to be.

Once the clips 16 are positioned where desired, an item, such as a wire cover 10 for PV panel wiring, would be placed, such as over wires 12 joining panels 14 together and with the elongate hole or slots 38, 40 in one of the flanges 28, 30 overlying the clip 16 and aligned with the holes in the clip 16. A fastener 20, such as a bolt, would then be passed through the elongate hole 38, 40 in the flange 28, 30 and then passed through the non-threaded hole 72 in the outer, long leg 60 of the clip 16, and then threaded into the threaded hole 74 in the short leg 58 of the clip 16. See FIG. 20. Once the fastener 20 has been tightened, not only has the clip 16 been secured in position against the trim 48 of the panel, but also the item, such as the wire cover 10 for PV panel 14, has been secured to the structure, such as PV panel 14, as well. This process is repeated with additional clips 16 at corresponding locations on other portions of the items to securely cause the items to be mounted, such as wire covers 10 to overlie wires 12 joining the panels 14 together.

As one optional feature, with the clip formed of plastic or with a clip formed of metal, rather than providing full threads on the lower plate of the clip, mere portions of threads can be provided strategically on opposing sides of the hole which can engage threads on the fastener as the fastener is rotated and still provide the basic required function of allowing the fastener to draw the clip tightly closed and capturing the trim on the rear of the solar panel therebetween. These partial female thread structures typically span less than 90° of the full circle of the lower hole and are provided in a set of two which are radially opposed from each ot~er on opposite sides of the hole (in one example only one of the two thread portions is visible, with the other thread portion directly opposite the one shown). While it is conceivable that such threads could be provided on both upper and lower holes, most preferably such threads are only provided on the lower hole. In such a manner, when the head of the fastener impacts the flange of the cover the further rotation of the bolt causes the tightening of the flange against the top plate of the clip and then the top plate of the clip is drawn toward the bottom plate of the clip which has the hole with threads therein. Tightening is thus achieved.

Figure 6:
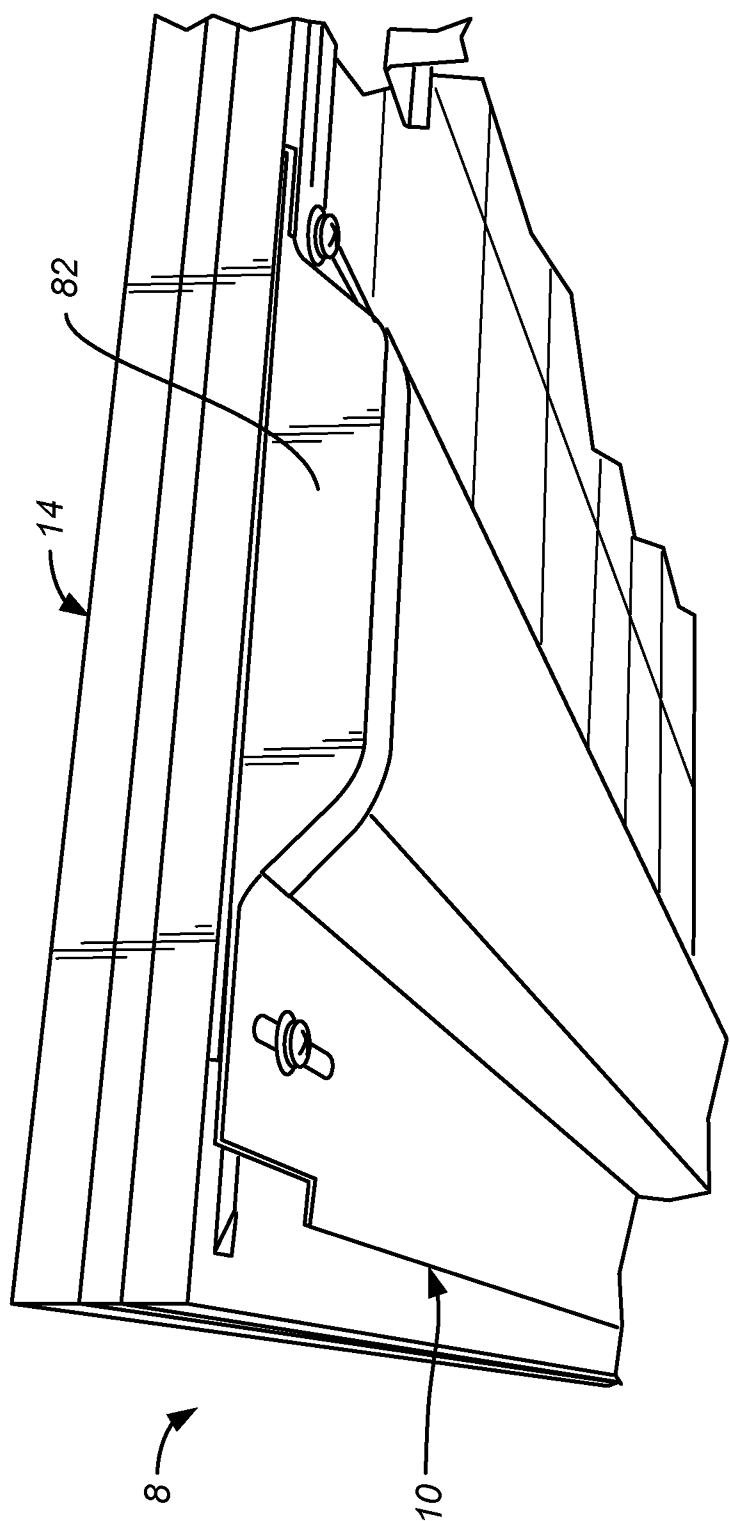
FIG. 6 shows an end cap covering the outermost end of the wire cover at the end of the array of photovoltaic panels.
Figure 7:
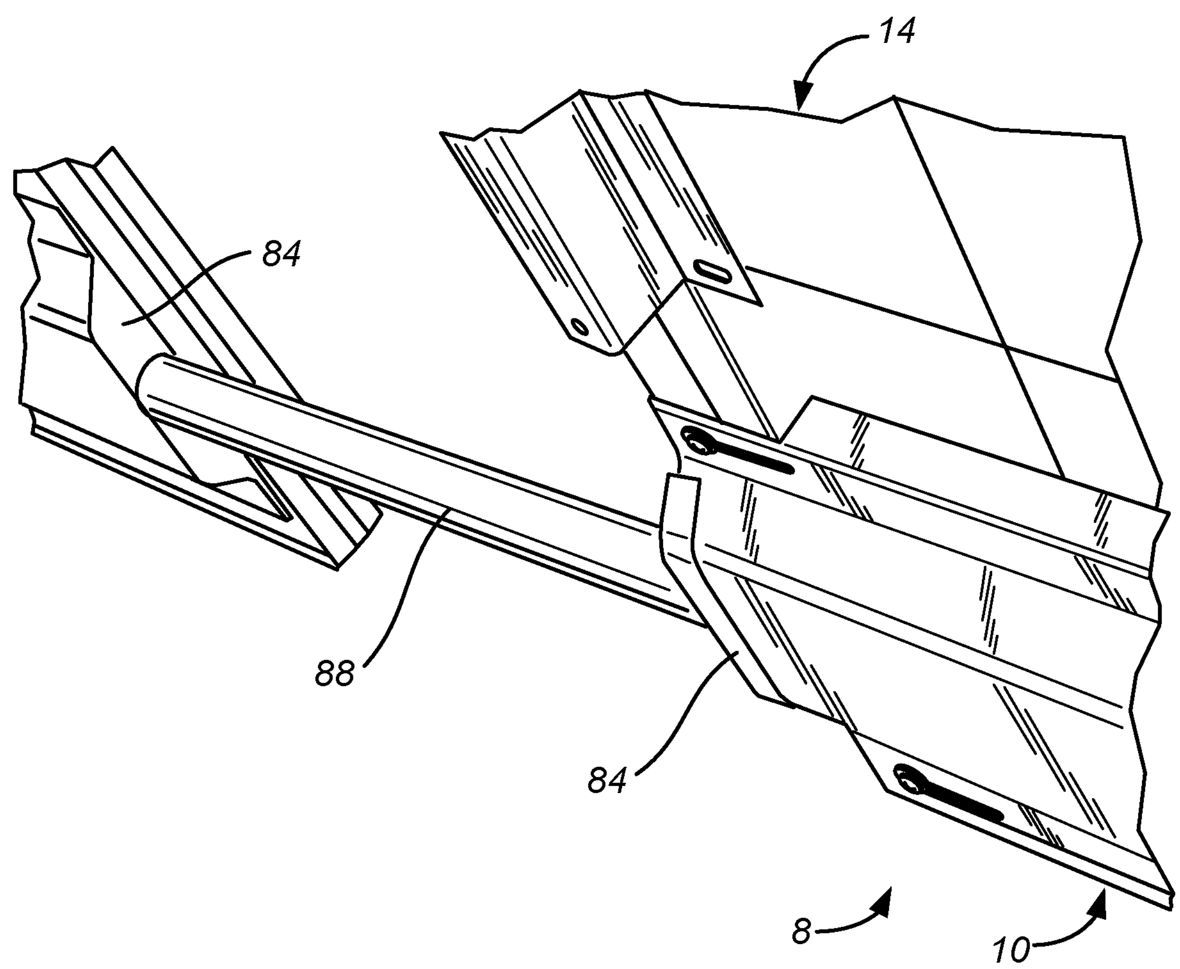
FIG. 7 shows a jumper tube extending between open end caps to protect wires passing between space-apart PV panels.
Figure 8:
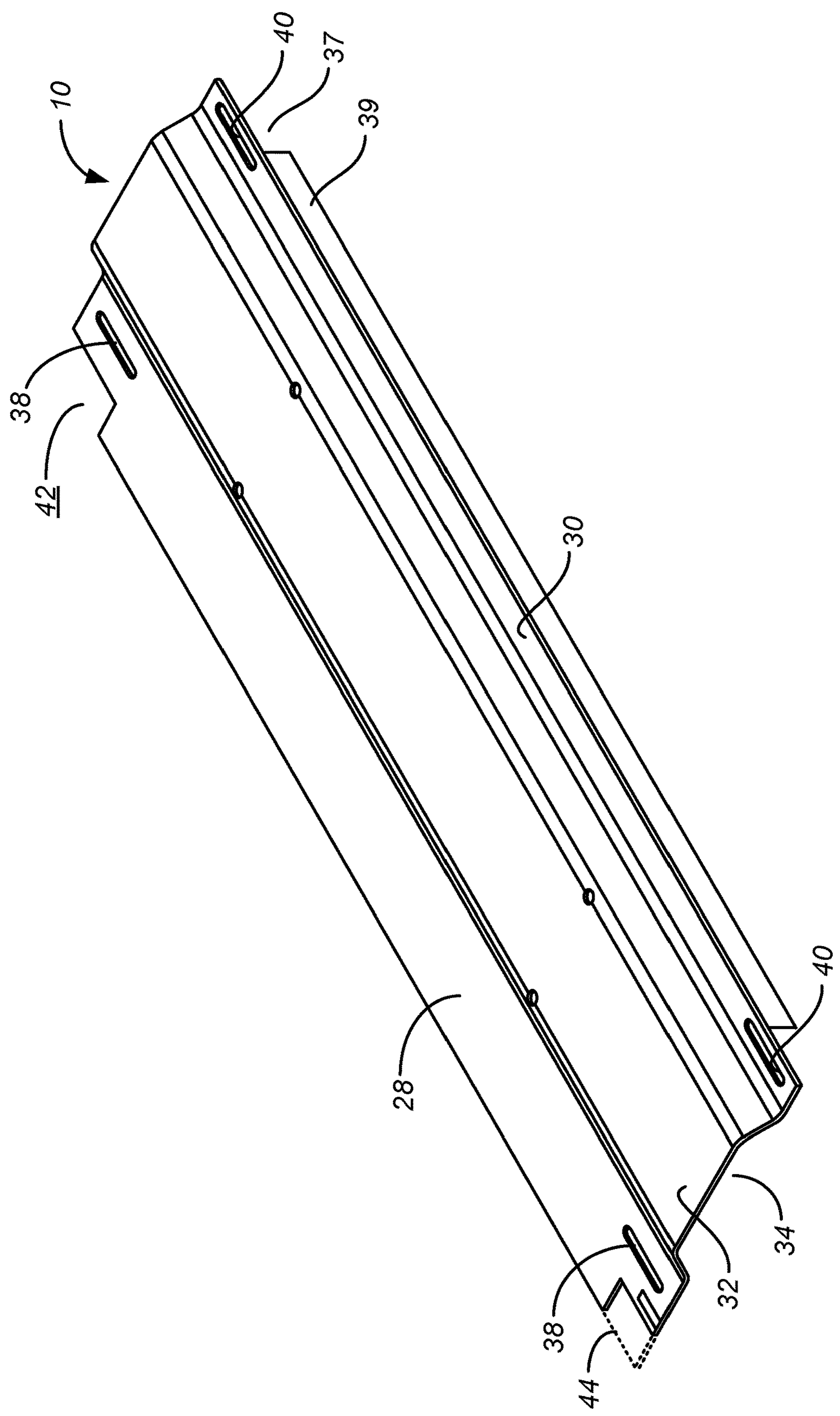
FIG. 8 is a top, front, right side isometric view of a wire cover.
Figure 9:
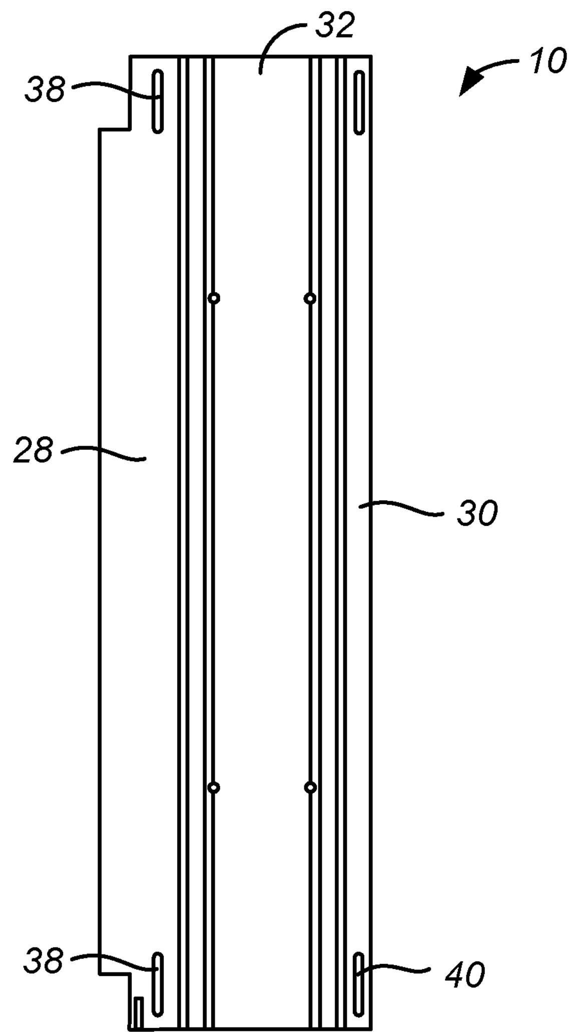
FIG. 9 is a top plan view of the wire cover of FIG. 8.
Figure 10:
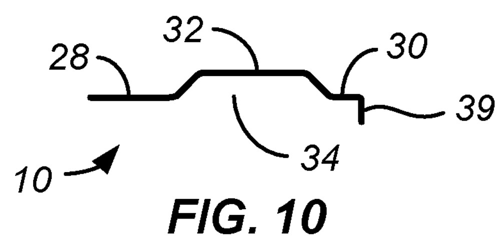
FIG. 10 is an end view of the wire cover of FIG. 8.
Figure 11:
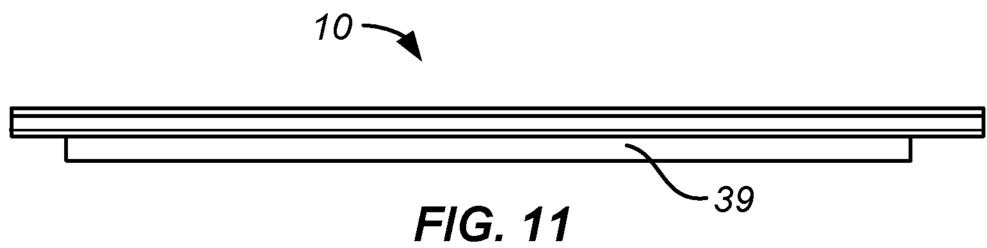
FIG. 11 is a left side view of the wire cover of FIG. 8.

FIG. 6 shows a closed end cap 82 covering the outermost end of the wire cover 10 at the end of the array 22 of photovoltaic panels 14. Details of end cap 82 are shown in FIGS. 14-16. FIGS. 7 and 17-19 illustrate an open end cap 84 secured to the outermost end of a wire cover 10. Open end caps 84 are used when there is a gap between PV panels 14, such as when there is a motor or other obstruction in the way on tracked arrays of PV panels. Open end cap 84 defines a wire passage opening 90 and has an extension 86 over which a jumper tube 88, see FIG. 7, is mounted. Wires 12 pass between the spaced-apart PV panels 14 along a wire passageway through wire passage opening 90, through curved extension 86 and through jumper tube 88. Extension 86 and jumper tube 88 have complementary cross-sectional shapes for snug mating engagement. Instead of generally cylindrical shapes. Other shapes, such as rectangular, or combination of curved and straight sided shapes can be selected. The use of closed end caps 82 and open end caps 84, together with jumper tube 88, helped to protect wires 12 from the elements, degradation or destruction by animals, and also helps to keep animals from entering housing interior 34. Jumper tube 88 can be made with somewhat flexible material, such as PVC or ABS, with a slit along its length to permit it to be placed over curved extensions 86 and the wires 12 extending between space-apart open end caps 84 as shown in FIG. 7. The length of jumper tube 88 is made to be slightly shorter than the distance between open end caps 84 so that it maintains contact with the curved extensions 86 of the open end caps.

If desired for further theft prevention, fasteners 20 having unique torque receiving surfaces can be used so that it is less likely that a thief has access to a proper tool for removal of such fasteners. The fasteners could be provided of a type which can allow for ready installation but does not allow for ready disassembly. For instance, rivets could be used instead of threaded fasteners or threaded fasteners with heads which allow for torque to be applied for fastening but not to be applied for removal. As a still further option, the fasteners could have heads which snap off after the fastener has been used, so that the torque applying head is removed and unavailable for theft access after installation.

Typically, wire covers 10 are provided which are of standard lengths which allow for convenient handling thereof, such as six foot lengths or ten foot lengths. The wire covers 10 can have a length slightly greater than the width of the PV panels so that they span the gap typically provided between adjacent panels and overlap each other somewhat at ends thereof to allow for continuous covering of the wires 12. Each wire cover 10 may have a length which spans one or more panels 14. The positions of the slotted holes 38, 40 are preferably selected to generally match widths 78 of the panels 14 but with the slotted holes sufficiently long to accommodate variations in panel size as well as spacing 46 between adjacent panels 14. The covers 10 preferably have notches 37 in the skirt 39 extending downwardly from flange 30 adjacent to slots 40, see FIGS. 4A and 8-11. Notches 37 allow an operator to reach under the cover and positioned the clip where required so that the fastener can be inserted.

In some embodiments wire cover 10 can be provided with a planar form and be sufficiently thin so that it can be inserted into a gap beneath trim 48 along an edge of PV panel 14 adjacent to where the wires 12 are typically located. The opposite flange would be held through the use of clips 16 and fasteners 20 engaging the appropriate slots.

Covers 10 can be made of bent metal, such as galvanized sheet steel or of sheet aluminum. Covers 10 can also be made of polymer materials, such as PVC, typically through extrusion or molding techniques. While clips 16 are preferably made of materials such as spring steel to aid proper positioning; in some examples clips 16 may be made materials, such as layered materials, which may or may not exhibit the degree of resilience provided by spring steel. The covers 10 and clips 16 could alternatively be made of non-metal materials or metals of other varieties to optimize desired performance characteristics or to minimize expense or otherwise provide for benefits associated with particular materials selected.

This disclosure is provided to reveal a preferred embodiment of the technology and a best mode for practicing the technology. Having thus described the technology in this way, it should be apparent that various different modifications can be made to the preferred embodiment without departing from the scope and spirit of this disclosure. When structures are identified as a means to perform a function, the identification is intended to include all structures which can perform the function specified. One or more elements of one or more claims can be combined with elements of other claims. Any and all patents, patent applications and printed publications referred to above are incorporated by reference.

What is claimed is:

1. A u-shaped mounting clip for mounting an element to a structure, the structure having a trim piece, the trim piece having a thickness, the clip comprising:

a single component formed of a continuous piece of material, the single component comprising (i) a proximal end, (ii) a u-shaped curved region located at the proximal end, (iii) a long leg extending from a first leg of the u-shaped curved region and (iv) a short leg extending from a second leg of the u-shaped curved region, the long leg essentially being joined to the short leg via the u-shaped curved region located at the proximal end of the u-shaped mounting clip, the long leg and the short leg each having a distal end, and the short leg essentially being parallel to the long leg from the distal end of the short leg to the u-shaped curved region located at the proximal end of the single component;

a gap between the long leg and the short leg of the clip and sized for receipt of the trim piece of the structure; and holes passing through the short leg and the long leg, the holes being aligned with each other and located closer to the proximal end of the clip than the respective distal ends of the long leg and the short leg, wherein the long leg of the clip is positionable against the element, and wherein the hole in the long leg is a through hole through which a threaded fastener can freely pass and the hole in the short leg is a threaded hole for threaded engagement with the threaded fastener, whereby the element can be fastened to the trim piece of the structure through the clip without penetrating the structure.

2. The u-shaped mounting clip according to claim 1, wherein the threaded hole of the short leg of the clip comprises a raised starter notch having a bend on one side that extends above a top surface of the short leg for engagement with threads on the threaded fastener.

3. The u-shaped mounting clip according to claim 2, wherein the clip comprises a trim engagement element at the distal end of the long leg.

4. The u-shaped mounting clip according to claim 3, wherein the distal end of the long leg is curved and constitutes the trim engagement element.

5. The u-shaped mounting clip according to claim 1, wherein the long leg and the short leg are drawn towards one another by the engagement of the threaded hole in the short leg by the threaded fastener.

6. A PV panel wire cover assembly mountable to a surface of a PV panel for covering wires extending along the surface of the PV panel, the wire cover assembly comprising:

an elongate wire-covering housing having first and second opposite sides, the wire-covering housing defining a housing interior;

a first flange extending away from the first opposite side;

the wire-covering housing securable to the surface of the PV panel through the first flange with the housing interior overlying the wires;

the wire-covering housing having a first open end and a second open end;

a closed end cap mountable to the first open end to prevent access to the housing interior when the wire-covering housing is mounted to the surface of the PV panel;

an open end cap mountable to the second open end, the closed end cap and the open end cap being separate components from one another and being individually mountable to the first open end and the second open end, respectively;

the open end cap having a wire passage opening; and a jumper tube extending from the open end cap and through another open end cap mountable to another end of another wire-covering housing to provide a wire passageway from the wire passage opening through the jumper tube, whereby the open end cap and jumper tube extending therefrom prevents access to the housing interior other than through the wire passageway when the wire-covering housing is mounted to the surface of the PV panel.

7. The assembly according to claim 6, wherein the open end cap has a hollow extension to which the jumper tube is mounted.

8. The assembly according to claim 7, wherein the jumper tube extends through another open end cap that is mountable to another end of another wire-covering housing to extend the wire passageway from the wire-covering housing to the other wire-covering housing.

* * * * *